United States Patent [19]

van Raalte et al.

[11] 3,708,712

[45] Jan. 2, 1973

[54] INTELLIGENCE-HANDLING DEVICE HAVING MEANS FOR LIMITING INDUCED ELECTROSTATIC POTENTIAL

[75] Inventors: John A. van Raalte, Princeton; Victor Christiano, Trenton, both of N.J.

[73] Assignee: RCA Corporation, New York, N.Y.

[22] Filed: Sept. 29, 1969

[21] Appl. No.: 861,592

[52] U.S. Cl. ....................315/10, 313/92, 178/7.5 D

[51] Int. Cl. ..........................................H01j 31/26

[58] Field of Search .......315/12, 10; 313/91; 178/7.5

[56] References Cited

UNITED STATES PATENTS

| | | | |
|---|---|---|---|
| 2,681,423 | 6/1954 | Auphan | 313/91 X |
| 2,910,532 | 10/1959 | Auphan | 178/7.5 D |
| 2,616,962 | 12/1952 | Jaffe | 313/91 X |
| 3,001,447 | 9/1961 | Ploke | 313/91 X |
| 3,517,126 | 6/1970 | Yamada et al. | 313/91 X |
| 3,389,382 | 6/1968 | Hart et al. | 178/7.5 D |

*Primary Examiner*—Carl D. Quarforth
*Assistant Examiner*—J. M. Potenza
*Attorney*—Glenn H. Bruestle

[57] ABSTRACT

An intelligence-handling device comprising an insulating substrate; and electron gun for scanning and depositing electrical charges on the surface of the substrate, the gun being regulated by electrical signals embodying the intelligence; and elemental conductors on the electron-bombarded surface, the elemental conductors being spaced apart by a distance adjusted to limit the electrical charges, and, therefore, the electrostatic potential, at the substrate to a desired maximum level. In one embodiment the device is further comprised of a light-reflective, deformable film fixedly disposed on the elemental conductors and deformed by the electrostatic potential at the substrate, the deformations corresponding in intensity and distribution to the intelligence. In another embodiment, the device is further comprised of an electrode disposed at the surface of the substrate directly opposite the bombarded surface, being comprised of an electro-optic crystal exhibiting localized polarization retardation in response to the electrostatic potential between the bombarded surface and the electrode. The distribution of the areas where polarization retardation occurs, as well as the degree of retardation, corresponds to the intelligence.

6 Claims, 6 Drawing Figures

INVENTORS
JOHN A. VAN RAALTE AND
VICTOR CHRISTIANO
BY [signature]
Attorney

INVENTORS
JOHN A. VAN RAALTE AND
VICTOR CHRISTIANO
BY Leon Nigohosian
Attorney

INTELLIGENCE-HANDLING DEVICE HAVING MEANS FOR LIMITING INDUCED ELECTROSTATIC POTENTIAL

BACKGROUND OF THE INVENTION

The present invention relates to intelligence-handling devices utilizing a pattern of electrical charges in depicting information and more particularly to light valves and other devices employing a means for limiting the induced electrostatic potential produced by such charges.

The prior art has disclosed information display systems which include light valves of the electrostatically-deformable film variety wherein an electrostatic charge pattern deposited on an insulating body in accordance with external video signals, acts on an adjacent light-reflective film to produce a corresponding pattern of local deformations therein. By means of a schlieren optical system known in the art, light is directed to the film and selectively redirected therefrom in accordance with the pattern of local deformations of the film, the redirected light thereafter being projected into a screen to produce a visible image. The image thus produced corresponds in intensity and distribution to the deformations in the film and, therefore, corresponds to the video signals. Such light valves, which are discussed in *Electronic Image Storage, B. Kazan et al., at pages* 261 to 273, may incorporate as deformable films those comprised of oil, thermoplastic material, or metal. U.S. Pat. No. 2,681,423 to M. Auphan discloses one such information display system which includes a cathode ray tube containing a screen comprising an insulating body; a conductive sheet (or film) arranged parallel to, and spaced apart from, the insulating body; and separating means (i.e., rods or fingers) connecting the conductive sheet to the insulating body so as to permit the conductive sheet to assume locally non-parallel positions with respect to the insulating body under the action of cathode rays impinging upon the conductive sheet. Visible radiation from an external source is projected on the conductive sheet and then reflected by the sheet to a screen or other means to provide a visible display. In the electrostatically-deformable film light valves, the decay of the electrostatic charge allows the film to be restored to its original state so long as the deformation thereof is elastic. These areas of the film which are inelastically deformed are rendered useless for subsequent information handling.

In such prior art display systems, an excessive level of electrostatic charge creates a comparable electrostatic potential which, in turn, leads to the possibility that such a high electrostatic potential will deform the film thereof to such a degree as to cause permanent (i.e., inelastic) deformation and/or breaking of those portions of the film corresponding with the location of these excessive charges, thereby making these deformed or broken portions inoperative and lowering the quality of the images produced by such display systems. Excessive deformation (overmodulation) of the film is objectionable even where no permanent damage occurs (i.e., deformation is elastic) because it causes the deformed portions of the film to reflect incident light such that the reflected light does not fall onto the screen. An excessive level of electrostatic charge can be brought about by the inability to control closely the current of the cathode rays, which inability can arise from apparatus limitations and/or from changes in the emission of the cathode; or by changes in the electrical discharge time (i.e., the time required for the charge deposited at each unit area by the electron beam to leak off to an adjacent conductor) of the insulating body, extended discharge times causing the accumulation of electrical charges on the insulating body and a consequent build-up of the electrostatic potential.

Also known in the prior art are light valves comprising an electro-optic crystal having two parallel plane surfaces, one surface bearing an electrode and the other surface being scanned by an electron beam. In this variety of light valve, the polarization of light transmitted through the crystal is affected by local variations in birefringence produced when the electro-optic crystal is subjected to an electrostatic potential extending between the scanned surface thereof and the electrode. Such electrostatic potential is produced by a pattern of electrostatic charges deposited on the crystal by the scanning electron beam in accordance with external electrical signals. These variations in birefringence arise by the phenomenon referred to as the Pockel effect where an electric field applied to the electro-optic crystal causes a phase difference, or relative retardation, in the plane polarized light which is passed through the crystal. Light is passed through the electro-optic crystal which is subjected to the electrostatic potential and through crossed polarizers and thereafter projected on a screen, thereby imaging the electrostatic charge pattern located on the crystal. An excessive level of electrostatic charge at the surface of the electro-optic crystal creates a comparably excessive level electrostatic potential which often leads to an electrical breakdown in the crystal, such an electrical breakdown adversely affecting the operation of this light valve as well as the quality of the image produced thereby.

SUMMARY OF THE INVENTION

The novel intelligence-handling device includes an evacuated envelope containing an improved electrical charge-collecting target and an electron gun for producing such electrical charges at the target.

In one embodiment of the invention a light valve includes the improved target which is comprised of an insulating substrate having a plane surface; a plurality of spaced apart elemental conductors disposed on the surface of the substrate and electrically interconnected, and a light-reflective, electrostatically-deformable metal film fixedly disposed on the conductors and spaced from the substrate. A maximum value of electric field intensity is sustainable by the substrate surface. A pattern of electrical charges, which is produced on the substrate surface by the electron gun and corresponds to certain intelligence embodied in electrical signals impressed on the electron gun, produces an electrostatic potential between the substrate and the film. The electrostatic potential produces local deformations in the film, the deformations corresponding in degree and distribution to the electrical charge pattern and, therefore, to the intelligence. The spacing between adjacent elemental conductors is adjusted such that the amount of electrical charge sustainable by the various portions of the substrate surface, and, therefore, the resulting electrostatic potential, is limited to a desired level. By means of a schlieren optical system, light is reflected from the metal film and projected on a screen to provide an image depicting the intelligence.

In another embodiment of the invention, an electro-optic light valve contains the improved target which is comprised of a substrate comprising an electro-optic crystal which exhibits localized changes in optical behavior in response to an electrostatic potential acting thereon, the electro-optic crystal having two substantially plane parallel surfaces; and electrode disposed on a first such surface; and a plurality of spaced-apart elemental conductors disposed on the second such surface, the conductors being electrically interconnected. The electro-optic crystal is able to sustain at its surface a definite maximum level of electric field intensity. A pattern of electrical charges is produced on the second surface by the electron gun. The charge pattern, which corresponds to intelligence impressed, in the form of electrical signals, on the electron gun, produces an electrostatic potential between the second surface and the electrode on the first surface, which electrostatic potential produces the above localized changes in optical behavior, the degree of change being proportionate to the electrostatic potential and, hence, the intelligence. The spacing between adjacent elemental conductors is adjusted so that the amount of electrical charge sustainable by various portions of the substrate surface, and therefore, the resulting electrostatic potential, is limited to a desired level. Using crossed polarizers, light is passed through the crystal and projected on a screen to provide an image depicting the intelligence.

By limiting the electrical charge and, therefore, the electrostatic potential to a desired level through the use of the present invention, there are achieved a number of advantages. Some advantages achievable in a light valve employing an electrostatically deformable film are the minimization of the possibility of breaking or inelastic deformation of the metal film due to excessive electrostatic potentials and the optimization of the degree of deformation of the metal film so that the produced images are of higher brightness. Some advantages achievable in electro-optic light valves are the minimization of the possibility of electrical breakdown in the electro-optic crystal due to excessive electrostatic potentials and the optimization of changes in optical behavior of the crystals so as to produce images of higher brightness.

DESCRIPTION OF THE PREFERRED EMBODIMENT

Figure 1:
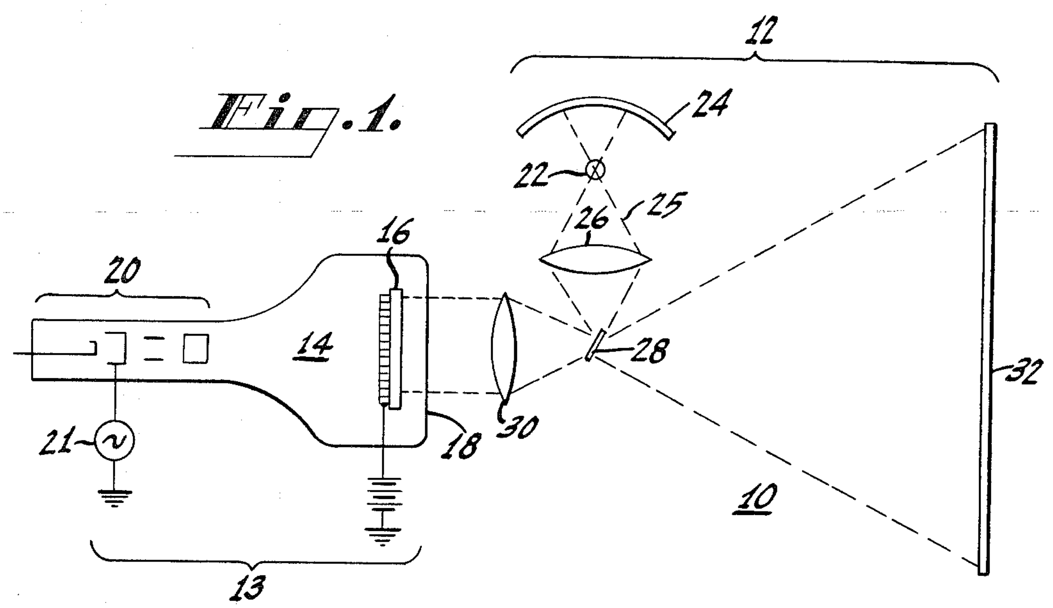
FIG. 1 is a schematic representation of an information display system including a schlieren optical system and a light valve made according to the present invention.

An information display system 10 (FIG. 1) utilizing an electrostatically-deformable film includes a schlieren optical system 12 and a light valve 13 comprised of a cathode ray tube 14 containing a target 16 disposed near the faceplate 18 of the tube 14 and supported by means (not shown) known in the art. The target 16 is deformable by electrostatic forces arising from electric charges deposited thereat by an electron gun 20 of the cathode ray tube 14 the gun 20 being controlled by a signal source 21. The schlieren optical system 12 is comprised of an external light source 22 such as Xenon arc lamp, for example; a concave mirror 24 which reflects light 25 from the light source 22; and a condensing lens 26 which projects the light 25 toward a small mirror stop 28. The light is deflected by the stop 28 and collimated by a projection lens 30, the collimated light thereafter impinging upon the target 16 of the cathode ray tube 14. When the electron beam (not shown) of the cathode ray tube is "off," the target 16 is undeformed and acts as a plane mirror, light which falls on the target 16 being reflected back through the projection lens 30, focussed on the stop 28, and then returned to the light source 22. However, when the target 16 is scanned by an electron beam according to certain intelligence embodied in electrical input signals, which signals are applied (by means 21 known in the art) to the electron gun 20 to modulate the electron beam, there result locally deformed areas (FIG. 4) of the target 16. The target 16 and the projection lens 30 are arranged such that the target 16 is imaged on a screen 32. Such deformed areas of the target 16 redirect portions of the incident light according to the respective degree of deformation thereof, such that these redirected portions by-pass the stop 28 and fall on the display screen 32. Each such deformed area of the target produces a light spot on the screen 28, the various light spots collectively constituting an image which portrays the abovementioned intelligence. The brightness of the various light spots imaged on the screen 32 is analogous to the amount of deflection of the light reflected by the target 16 (i.e., to the amount of redirection of the incident light) and, therefore, to the degree of deformation of their respective areas of the target 16.

Figure 2:
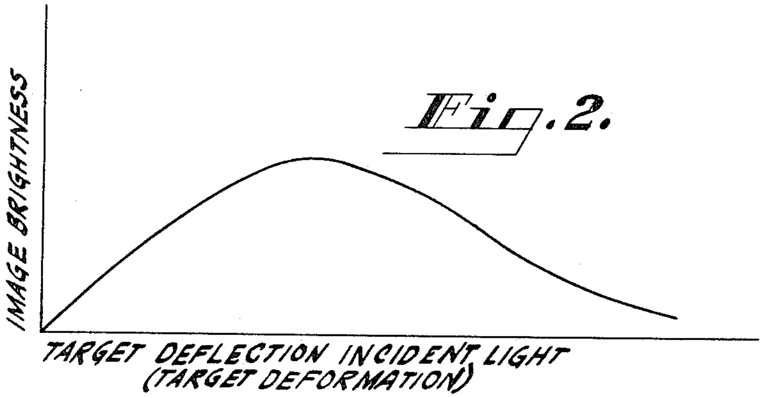
FIG. 2 is a graphic description of the relationship between target deformation in a light valve and resulting image brightness.

As shown in FIG. 2, the brightness of the image produced on the screen 32 rises with increasing deflection of the reflected light and therefore, with increased deformation of the target 16, increased light deflection resulting in more light circumventing the stop 28. Image brightness then reaches a maximum, thereafter, dropping off as the continued target deformation results in the deflection of the reflected incident light beyond the projection lens 30 and the consequent avoidance of the screen 32.

Figure 3:
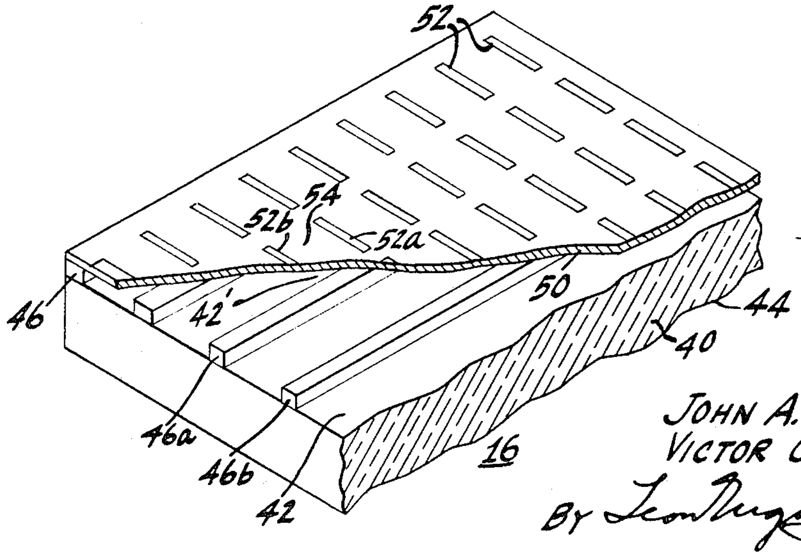
FIG. 3 is a fragmentary sectional perspective view of an electrostatically deformable target made according to the present invention.

The deformable target 16 (FIG. 3) is comprised of a substrate 40 of insulating material, such as glass, for example, having two continuous, substantially-parallel surfaces 42 and 44. While the surfaces 42 and 44 are shown as being plane, they may also be non-planar (e.g., spherical). Also, the faceplate of a cathode ray tube could be used as the substrate so that the target is not physically removed from the faceplate as in FIG. 1. The target 16 is further comprised of a plurality of electrically interconnected conducting strips 46 which are periodically disposed on one of the substrate surfaces 42 and a light-reflective, electrostatically deformable metal film 50 fixedly disposed on and in electrical connection with the strips 46. The film 50 is sufficiently thin (e.g., about 1 micron) so as to be electron-permeable. In accordance with the invention the distance between adjacent strips and the film thickness are adjusted to achieve certain desired results, including protection from modulation of the metal film 50. The relationship for determining this distance and film thickness is given hereinafter. The film 50 may be made of alloys of nickel, copper or aluminum, for example. The strips 46 may be of metal or metallic alloys (e.g., the above alloys) or made from transparent conductor materials known in the art. The deformable metal film 50 may be formed with elongated apertures 52 extending in the direction perpendicular to the strips 46, (the apertures 52 may be at 100$\mu$ intervals, for exaMple), or it may be continuous (not shown) or comprised of a plurality of individual strips (not shown) extending perpendicularly to the conductive strips 46. There may be used conductors having other than a "strip" configuration; for example, a conductor having a network configuration or a plurality of electrically interconnected conducting posts. The apertures 52 of the film 50 extend between the conducting strips 46, which strips are of sufficient height (e.g., 5$\mu$) to prevent the film 50 from coming into contact with the substrate 40 during the operation of the tube 14. Each film portion (e.g., 54) extending between two adjacent conducting strips (e.g., 46*a* and 46*b*) and the two adjacent apertures (e.g., 52*a* and 52*b*) located between these two strips as well as the substrate surface portion (e.g., 42') generally corresponding thereto, define a single picture element.

Figure 4:
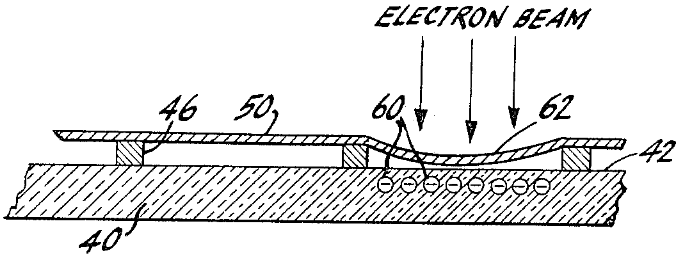
FIG. 4 is a sectional elevation view of a target made according to the present invention and including a locally deformed light-reflective film.

In the operation of the cathode ray tube 14 (FIG. 1), the target 16, which is maintained at a potential of about 20KV relative to the electron gun 20, is scanned by an electron beam produced by the electron gun 20, the metal film 50 being sufficiently thin so as to allow a substantial part of the electron beam to penetrate and pass to the substrate 40. As the electron beam scans the target 16, it is modulated by the electrical input signals applied to the gun 20. The electron beam portions which penetrate the film 50 and land on the substrate 40 deposit thereon a pattern of negative electrical charges. The intensity and distribution of the charge pattern corresponds to variations in the beam current during the scanning of the target 16 and, therefore, to the electrical signals applied to the electron gun 20. As shown in FIG. 4 (wherein numbers identical to those of FIG. 3 indicate corresponding elements) such negative electrical charges 60 induce an electrostatic potential which attracts and thus deforms the areas of the positively biased (with respect to the substrate) metal film 50 comprising the respective picture elements (e.g., 62) of the target 16. Alternatively, the substrate can be positively charged by secondary electron emission therefrom, in which case the metal film is negatively biased with respect to the substrate. In accordance with this invention, the spacing between these strips 46 is adjusted such that there is a limit to the amount of electrical charge at the various picture elements 60 that can be sustained on the substrate 40, the strips 46 acting as leakage paths for any electrical charges exceeding this limit. Such a limitation of the electrical charge on the substrate results in the limitation of the electrostatic potential induced thereby to a desired level. Hence, the desired level of electrostatic potential and, therefore, the desired degree of film deformation, can be achieved by adjusting the spacing between the strips 46 according to the approximate relationship $$V = (Emax\,\lambda)/2 \qquad (1)$$

where V is the maximum desired value of induced electrostatic potential, which potential, in the deformable film display, exists between the metal film 50 and the substrate 40; $\lambda$ is the inter-strip spacing; and Emax is the maximum electric field that the substrate 40 can support along its surface 42. The value of Emax is characteristic of the substrate material, and is about $1.15 \times 10^6$ V/cm for soda glass. A potential (V') equal to the maximum electrostatic potential (V) between the metal film 50 and the substrate 40 also exists along that part of the substrate surface 42 located between the center of an inter-strip spacing (e.g., 42' in FIG. 3) and conducting strips (e.g., 46*a* and 46*b* in FIG. 3) adjacent to the center of the inter-strip spacing. Hence, the control of the electrostatic potential (V') at the substrate (by adjusting the inter-strip spacing ($\lambda$) and hence, the control of the maximum electrostatic potential (V) between the film 50 and the substrate 40, to desirable levels minimizes the possibility of excess deformation of the metal film. As previously mentioned, the schlieren optical projector 12 (FIG. 1) converts the amplitude of the deformed picture elements (e.g., 62 of FIG. 4) of the film 50 into analogous light regions on the screen 32. The intensity of the respective light regions corresponds to the applied electrical signals.

Figure 5:
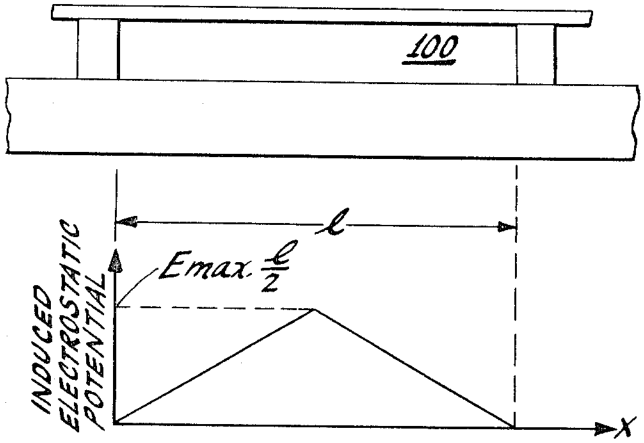
FIG. 5 is a graphic description of the level of induced electrostatic potential over a portion of an insulating substrate surface lying between two conductors.

As indicated by equation (1) above, the maximum electrostatic potential (V) of the target is limited by the maximum electric field (Emax) that the target substrate can support along its surface. The electric field over each substrate surface portion (e.g., 42') is substantially constant and the induced electrostatic potential (FIG. 5 where a partial cross-section of a target is schematically represented by 100) is a substantially linearly increasing function of the distance from the edge of a picture element toward the center of the picture element, the maximum electrostatic potential (V) (and therefore, maximum attractive force) occurring at the center of each picture element. The limitation of the electron beam-deposited charges, and, therefore, the induced electrostatic potential, by this invention does not involve the charge leakage by any type of destructive breakdown mechanism at the substrate, but instead is brought about by a threshold-type mechanism resembling that of a zener diode. By the present invention, the electrostatic potential of the target substrate portions at the respective picture elements reaches a maximum level, (V) the electrical charges in excess of the charge level sufficient to produce the above maximum level of potential being continuously "drained off" by the conducting grids and thereby limiting the potential to a safe level.

A relationship for the spacing (λ) between the conducting strips of an electrostatically-deformable target and the thickness ($t$) of the deformable film thereof can be calculated by the following approximation $$\frac{l^3}{t}=\frac{0.4d^2E}{\epsilon_0 E^2_{max}}\theta_{max} \qquad (2)$$

where $d$ is the height (e.g., 5$\mu$) of the respective conducting grids of the target; E is the modulus of elasticity for the particular material from which the deformable film is made; $\epsilon_o$ is the dielectric constant of a vacuum; $E_{max}$ is the maximum electric field that the target substrate can support along its surface; and $\theta$ max is the maximum angle of deflection for reflected light that is possible with the particular schlieren optical system that is used. The value $\theta$ max is slightly below one-half of the acceptance angle of the projection lens (e.g., 30 in FIG. 1) of the particular schlieren optical system. The maximum angle of deflection ($\theta$ max) provides images of the highest light intensity (which is the most desirable result) since the greatest quantity of light bypasses the stop (e.g., 28 of FIG. 1) of the schlieren optical system. By determining the actual value for $\theta$ max (which is a constant value for a given projection lens) the optimum rates for $\lambda^3$/t can be determined from equation (2). Therefore, by adjusting the values for λ and $t$ to obtain substantially this optimum ratio, the image intensity can be optimized.

For example, in a target having a grid spacing (λ) of about 50$\mu$, a deformable film made of an alloy consisting essentially of 99 percent aluminum – 1 percent copper has a thickness ($t$) of about 6000 A. A film of the same composition and used with grids spaced apart by about 75$\mu$ will have a thickness of about 1$\mu$ (10,000 A). Both of these films can be penetrated by an electron beam of about 20KV.

The optimum inter-strip spacing, (λ) and therefore, the maximum electrostatic potential (V), is determined by the surface characteristics of the target substrate and by the deformability of the metal film, the latter depending on the modulus of elasticity of the film material and the film thickness. The inter-strip spacing and the film thickness can be adjusted such that the induced electrostatic potential along the surface of the insulating body is that which optimally deforms the metal film so as to produce the brightest image. A smaller inter-strip spacing leads to a smaller maximum electrical potential (V) producible at the substrate surface, and to an increased support of the film by the strips, increased support requiring that more electrostatic force to be used to deform the film. In this latter case, the possibility of overmodulation of the metal film is further reduced due to the lower force available to deform the film and the increased strength of the film.

Figure 6:
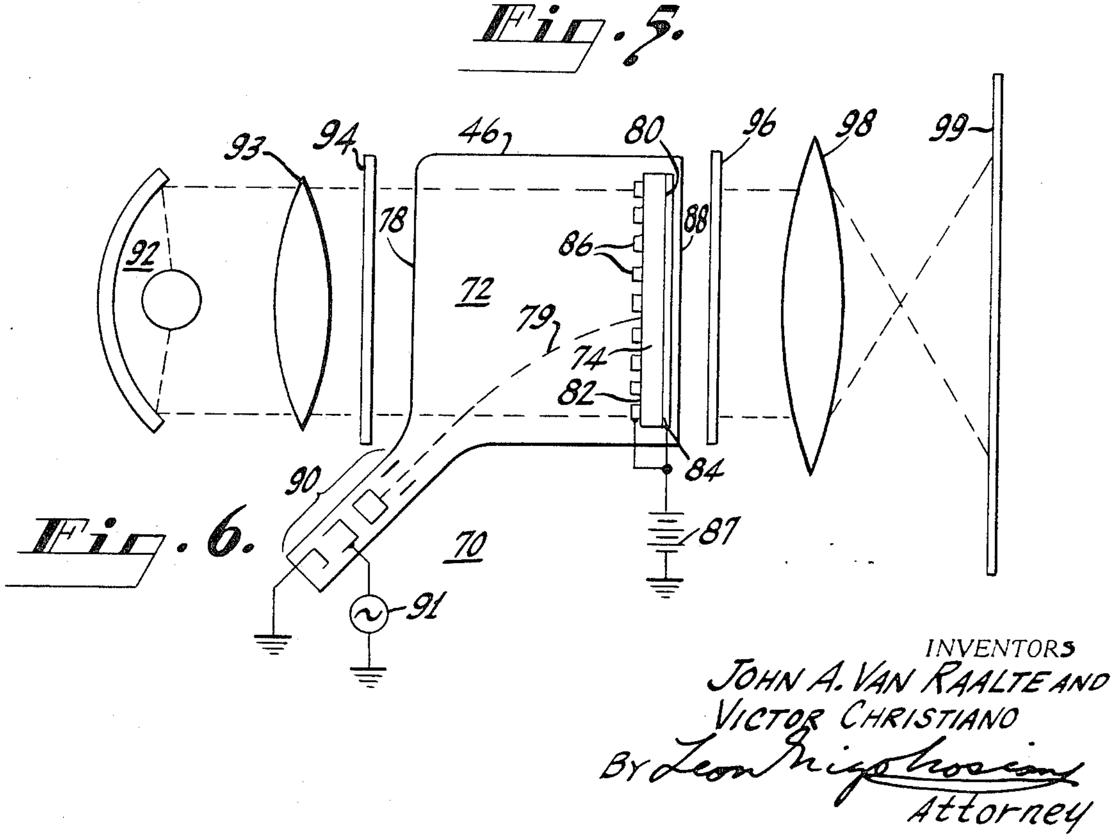
FIG. 6 is a schematic representation of an information display system including an electro-optic light valve produced according to the present invention and means for producing an image depicting information in the light valve.

FIG. 6 illustrates an information display system 70 wherein the display device is comprised of a cathode ray tube 72 containing an electro-optic crystal 74 which acts as a light valve. The cathode ray tube 72 is provided with a window 78 for the admission of light therein. The electro-optic crystal 74, which may be made of ammonium dihydrogen phosphate or potassium dihydrogen phosphate, for example, is disposed perpendicular to the respective paths of the incident light and electron beam 79 within the tube 72. There are two substantially parallel plane surfaces 80 and 82 of the crystal 74, one such surface 80 bearing a transparent conductive electrode 84 and the other such surface 82 bearing an array of periodically disposed conducting strips 86, which strips 86 are electrically connected to each other and to a potential source 87. The strips 86 can be electrically interconnected by means of a conducting rod (not shown), for example, disposed at and connected to the ends of the various conducting strips 86. The cathode ray tube 76 is further comprised of a faceplate 88 and an electron gun 90.

In the operation of the display system, the surface 82 of the electro-optic crystal is scanned by an electron beam from the gun 90. The beam is modulated during scanning by electrical input signals applied to the gun 90 by suitable means 91 known in the art. Electrons landing on the crystal surface 82 cause the surface to be charged negatively or positively, depending on the secondary emission ratio of the crystal, the charges being arranged in a pattern corresponding in distribution and intensity to the above input signals. The charge pattern induces corresponding local variations in electrostatic potential between the crystal surfaces 80 and 82. Generally, to provide a visible display of the information stored in the form of the charge pattern, light from a source 92 is collimated by a suitable lens 93 and passed through a first plane polarizer 94, after which the polarized light is passed through the crystal 74 on which the charge pattern is retained, a second plane polarizer 96 arranged at right angles to the first polarizer 94, and a projection lens 98 to a screen 99.

The abovementioned local variations in potential between the surfaces 80 and 82 cause the crystal to become locally birefringent so that there results a phase retardation of the light passing through these locally affected regions. A relatively phase retardation of 180° rotates the plane of polarization of the incident light by 90° by a mechanism known in the art. Light whose plane of polarization is so rotated then passes through the second polarizer 96, which as mentioned above, is at right angles to the first polarizer 94. On the other hand, there is no phase retardation of light passing through the crystal 74 at those portions of the crystal 74 where the electrical charges on the surface 82 are insufficient to induce a substantial electrostatic potential, and, therefore, there is no rotation of the polarization plane, such light not being transmitted through the second polarizer 96. By projecting on the screen 99 or otherwise displaying that light which is transmitted through the second polarizer 96 there can be produced a visible image corresponding to the information "written" on the crystal 74 in the form of the charge pattern. As the level of electrical charge on the surface 82 is increased, there is an increase in the electrostatic potential between the surfaces and, therefore, a greater amount of light is transmitted through the second polarizer, with the maximum amount of light being reached when there is a 180° phase retardation. If there is more than 180° phase retardation, the amount of light falls off with increasing phase retardation. By using the present invention, the conducting strips 86 are disposed on the surface 82 (according to Equation 1) such that the level of electrical charge, and thereby, the maximum induced electrostatic potential (V) at the crystal 74, is limited to a desired level (preferably, the half wave retardation voltage) thus minimizing the possibility of exceeding the maximum (i.e., half-wave) phase retardation and/or the possibility of electrical breakdown in the crystal. The inter-strip spacing (λ) can be calculated by the relationship given by equation 1, V in this instance being defined as the maximum desired level of electrostatic potential between the electron beam-scanned surface 82 of the crystal and the electrode 84.

While the present invention has been described in terms, of light valve devices of the electrostatically-deformable-film variety and those employing an electro-optic crystal, it is applicable to other devices where there is desired a limitation on the level of electrical charge and, therefore, electrostatic potential induced thereby, at an insulating body. Also, the present invention can be used with light valves wherein the insulating substrate of the electrostatically deformable target is composed of the faceplate of the cathode ray tube containing the target. Further, the present invention can be used in targets for electro-optic light valves where the image is produced by the reflection of light from the target rather than by the transmission of light therethrough.

We claim:

1. A light valve device comprising:

a. an evacuated envelope, said envelope containing a transparent substrate of electrically insulating material, b. a plurality of spaced apart, electrically interconnected elemental conductors disposed on portions of a surface of said substrate, other portions of said surface being accessible to the interior of said envelope, c. a light reflective metal film disposed on said elemental conductors in electrical connection therewith, said film being electron permeable and spaced substantially parallel with said surface, said film being capable of local deformation by an induced electrostatic potential provided by electrical charges located at said surface, there being, in the use of said device, an optimum amount of local deformation of said film less than the maximum possible local deformation thereof, and d. electron beam means within said envelope for scanning said accessible portions of said surface to provide a pattern of electrical charges thereat, said electron beam means being regulated by electrical signals impressed thereon, said signals embodying certain intelligence and said electrical charges providing an induced electrostatic potential between said surface and said metallic film, said pattern of electrical charges corresponding to said certain intelligence;

said elemental conductors providing leakage paths for the dissipation of electrical charge from said surface and being effective to limit the maximum induced electrostatic potential to that level corresponding to said optimum amount of local film deformation, said device being adapted to receive suitable radiation projected on said metal film and to cause deflection of the radiation by portions of said film which are locally deformed in accordance with said induced electrostatic potential so as to provide a visible output of said certain intelligence.

2. A light valve device as described in claim 1, wherein said substrate is a faceplate forming part of said envelope.

3. A light valve device as described in claim 1, wherein said film is interrupted by elongated apertures extending between said conductors, each film portion extending between two adjacent conductors and two adjacent apertures defining a single light valve element.

4. A light valve comprising:

a. an electro-optic crystal exhibiting polarization retardation in response to an induced electrostatic potential thereat, said crystal having two substantially parallel, continuous surfaces, b. electrode means disposed on a first one of said surfaces, c. electron beam means for scanning portions of a second one of said surfaces in accordance with electrical signals corresponding to certain intelligence, said electrical signals being impressed on said electron beam means, said electron beam means providing a pattern of electrical charges at said portions of said second surface, said electrical charges providing an induced electrostatic potential between said second surface and said electrode means so as to produce said polarization retardation in said crystal, and d. a set of spaced apart conductors disposed on said second surface, the spacing between said conductors being such as to cause dissipation of electrical charge from said second surface in excess of a preselected amount of charge effective to provide a preselected maximum induced electrostatic potential, corresponding to a retardation of 180°, between said second surface and said electrode means.

5. In a light valve device comprising an evacuated electron discharge tube containing a target, said target comprising an insulating substrate, a plurality of spaced apart electrical conductors on a surface of said substrate, and a light reflective metal film mounted on said conductors in spaced relation with said surface, said film being deformable in response to the presence of an electrical charge on said surface, there being, in the use of said device, an optimum amount of deformation of said film less than the maximum possible deformation thereof, the improvement wherein:

the spacing between said conductors is such as to prevent an accumulation of charge on said surface in excess of the amount of charge required to cause said optimum film deformation, whereby deformation of said film in excess of said optimum deformation is avoided.

6. The improvement in a light valve device as in claim 5 wherein the spacing between said connectors is determined by the following equation:

$$l=\sqrt[3]{\frac{0.4D^2MT\theta_{\max}}{\epsilon_0E_{\max}}}$$

where:

$\lambda$ is the spacing between said conductors;

D is the height of the conductors above the substrate surface;

M is the modulus of elasticity of the metal film;

$\epsilon_o$ is the dielectric constant of a vacuum;

$E_{max}$ is the maximum electric field that the substrate can support along the surface thereof;

T is the thickness of said film; and $\theta_{max}$ is a constant determined by the optimum amount of deformation of said film.

* * * * *